United States Patent [19]

Meamber

[11] 4,217,817

[45] * Aug. 19, 1980

[54] PORTABLE APPARATUS FOR RAPID GRILL COOKING

[75] Inventor: Jon F. Meamber, Redding, Calif.

[73] Assignee: Fast Food Fabricators, Inc., Redding, Calif.

[*] Notice: The portion of the term of this patent subsequent to Oct. 16, 1996, has been disclaimed.

[21] Appl. No.: 955,430

[22] Filed: Oct. 27, 1978

Related U.S. Application Data

[63] Continuation-in-part of Ser. No. 772,286, Feb. 15, 1977, Pat. No. 4,170,933, which is a continuation-in-part of Ser. No. 732,542, Oct. 14, 1976, abandoned, which is a continuation-in-part of Ser. No. 683,373, May 5, 1976, abandoned.

[51] Int. Cl.² ............................ A47J 37/06; A47J 43/8
[52] U.S. Cl. ........................................ 99/349; 17/25; 99/373; 99/419
[58] Field of Search ............... 99/324, 331, 349, 350, 99/352, 372, 374, 376, 380, 382, 419, 422, 426, 439; 17/25, 28

[56] References Cited

U.S. PATENT DOCUMENTS

| | | | |
|---|---|---|---|
| 663,483 | 12/1900 | Betts | 99/349 |
| 802,444 | 10/1905 | Date | 17/25 |
| 2,770,182 | 11/1956 | Jensen | 99/373 |
| 3,263,595 | 8/1966 | Bower | 99/349 |
| 3,380,377 | 4/1968 | Alexander | 99/349 |

Primary Examiner—George F. Mautz
Assistant Examiner—Timothy F. Simone
Attorney, Agent, or Firm—Townsend and Townsend

[57] ABSTRACT

A portable device for cooking slabs of meat at an arbitrary position on the grill in a reduced time period. The device comprises a flat heat conductive weighted member overlying slabs of meat to be cooked and having a plurality of spikes adapted to extend through the meat and contact the grill. A heat conductive apertured plate engages the spikes and is free to slide along the spikes while being prevented from moving out of engagement with the spikes. A peripheral skirt extends about the weighted member to protect the spikes. In operation the device is placed on the grill which directly conductively heats the apertured plate and the spikes. Subsequent placement over the slabs causes the weighted member to urge the spikes through the slabs, thereby cooking the slabs partially from within. The apertured plate sits atop the slabs of meat to promote intimate contact between the slabs and the grill and to cook the slabs partially from above. The apertured plate and the peripheral skirt prevent moisture loss. The result is a sharply reduced cooking time and lower energy requirement. When the device is lifted away from the slabs of meat, the weight of the apertured plate expels the slabs of meat and cleans the spikes of any meat fragments.

8 Claims, 5 Drawing Figures

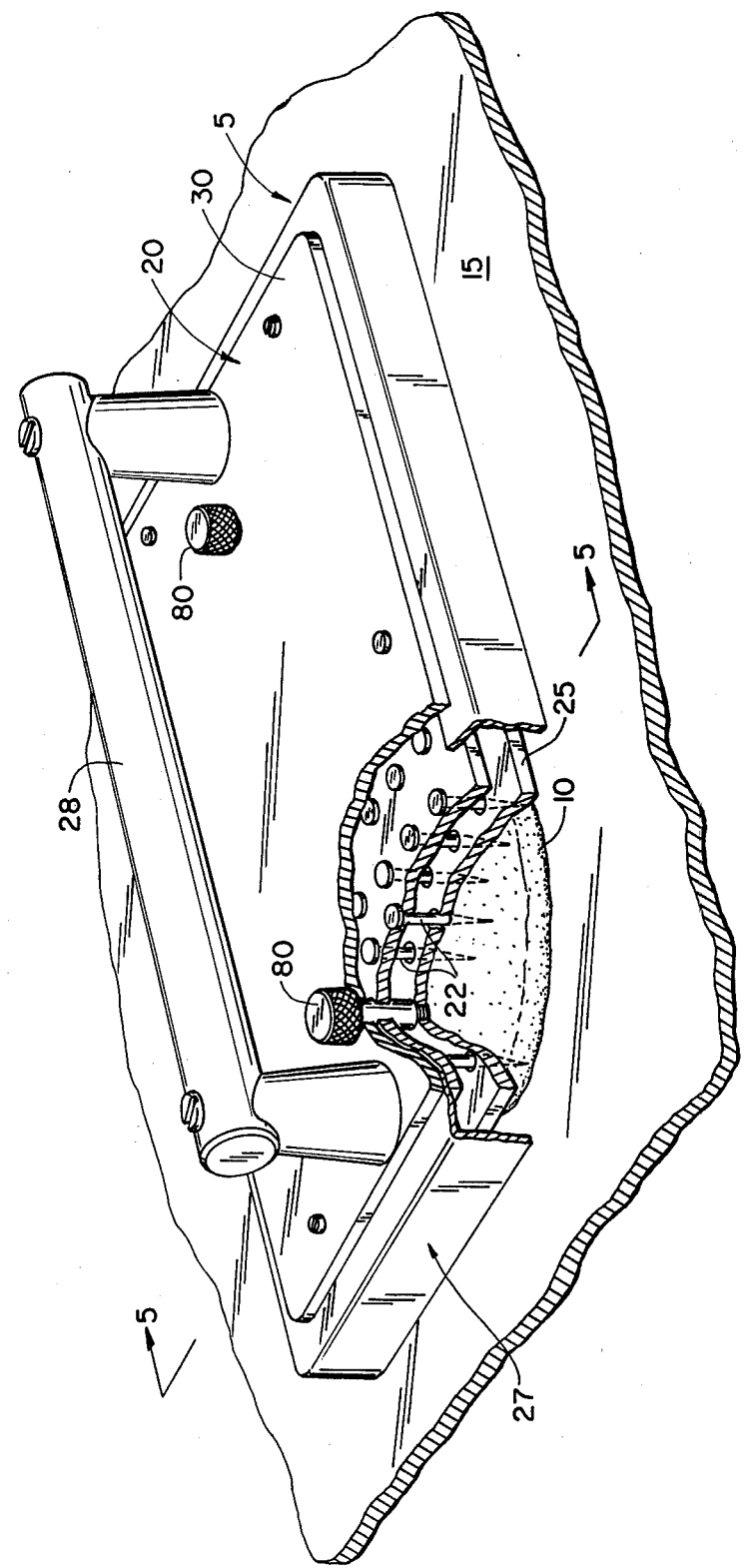
FIG.—I.

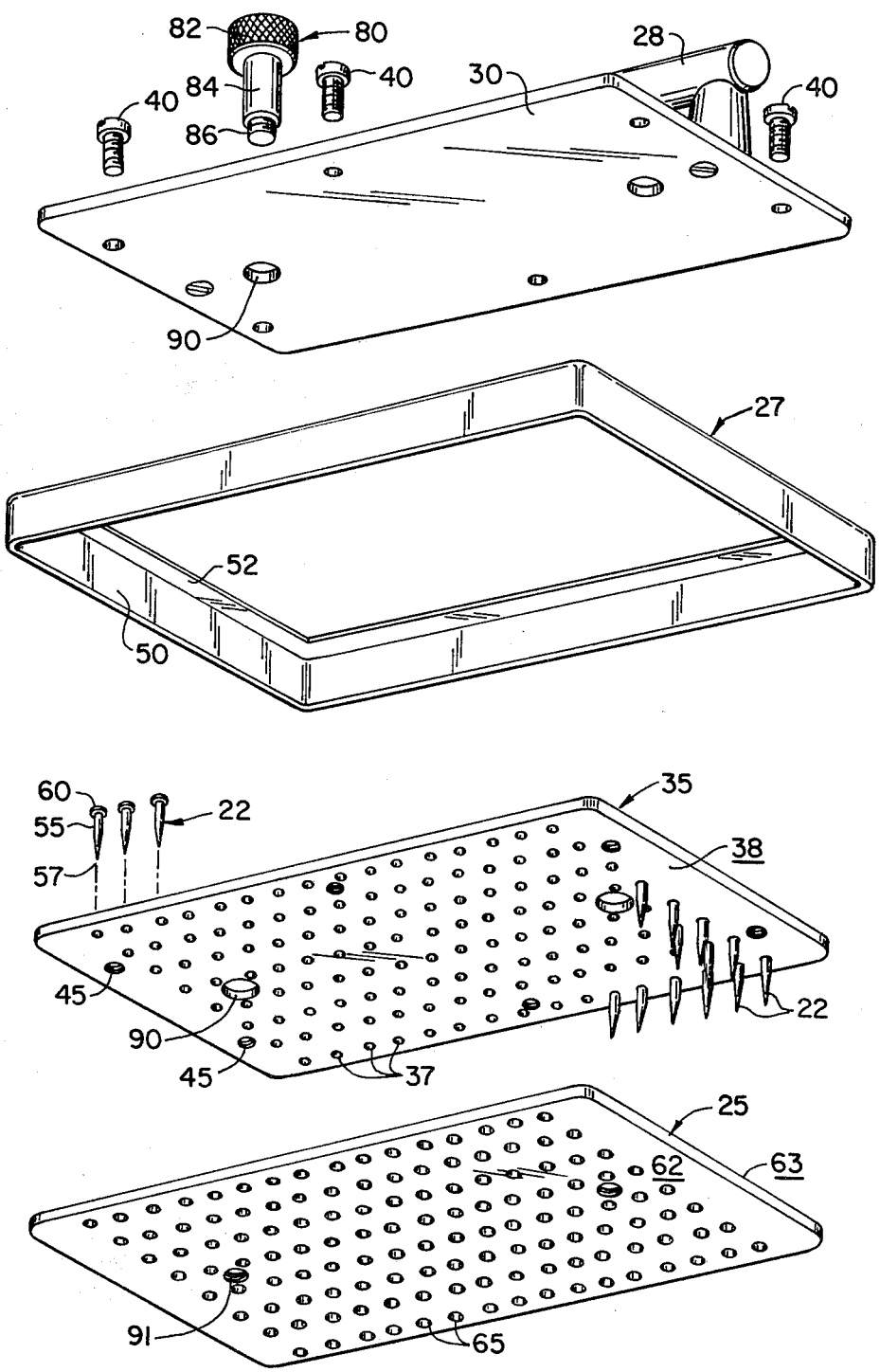
FIG._2.

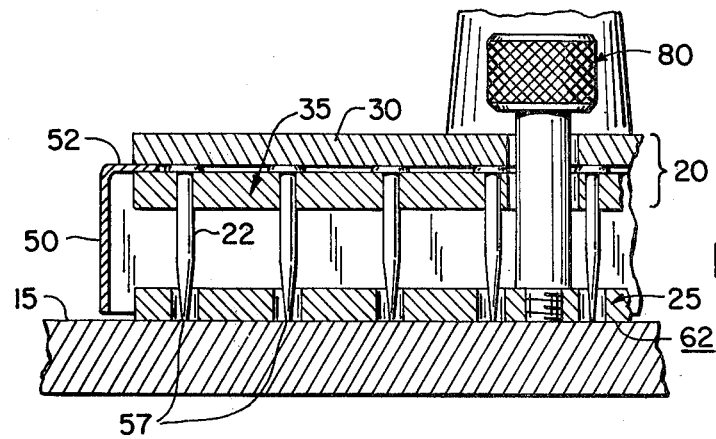
FIG._3.
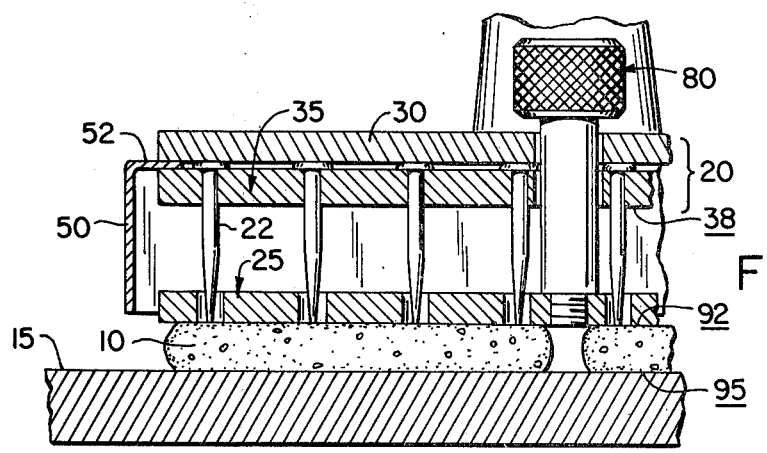
FIG._4.
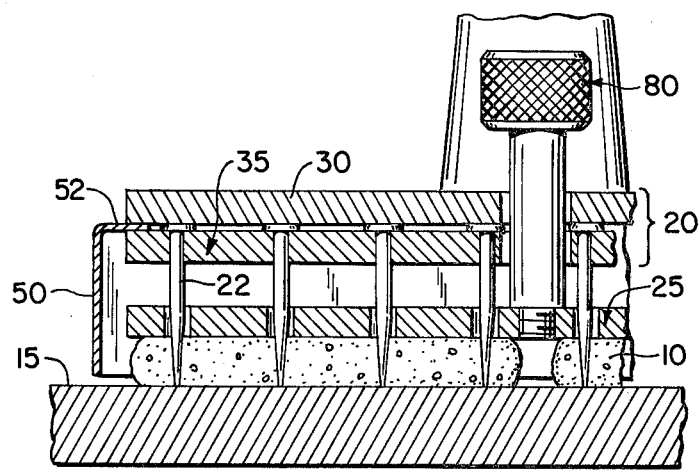
FIG._5.

PORTABLE APPARATUS FOR RAPID GRILL COOKING

CROSS REFERENCE TO RELATED APPLICATIONS

The present application is a continuation-in-part of co-pending application, Ser. No. 772,286, filed Feb. 15, 1977, U.S. Pat. No. 4,170,933 which is a continuation-in-part of co-pending application Ser. No. 732,542, filed Oct. 14, 1976, abandoned which is a continuation-in-part of application, Ser. No. 683,373, filed May 5, 1976. Ser. No. 683,373 was abandoned in favor of Ser. No. 732,542.

FIELD OF THE INVENTION

The invention relates to a portable device for cooking slabs of meat on a grill in a reduced time with reduced shrinkage.

BACKGROUND OF THE INVENTION

Commercial fast food restaurants that serve meat cooked on a grill depend on being able to cook the meat very quickly in order to maintain a high volume throughput. It is also important that the cooking be accomplished in a manner that can be readily achieved every time, as the customers depend on substantial uniformity of the served product, both over time and among multiple outlets of the same establishment. Moreover, in order to keep costs to a minimum, it is necessary that this cooking be readily accomplished by relatively unskilled operators with a minimum of effort while maintaining the required high degree of repeatability. Simple grill cooking with the operator using a spatula does not generally fill these needs. Yet a device for use with the grill must be portable to allow cooking at any location on the grill, and to permit the device to be cleaned. Such a device must be of simple construction to facilitate fast and effective cleaning.

It is known in the prior art to cook slabs of meat by pressing a heated plate against the slabs, and further to pierce the meat with metallic spikes during cooking. U.S. Pat. No. 2,770,182, to Jensen discloses an electric meat fryer for use with a heated grill. The meat fryer includes a heated plate overlying the grill and having a plurality of holes. A corresponding plurality of spikes, each spike resiliently fastened to an upper structure, passes through the holes in the plate. The heated plate is spring-biased away from the upper structure, which is mounted for movement towards and away from the grill by a rack and pinion mechanism. During cooking, the device is biased downwardly against the meat with sufficient force to overcome the spring-biasing on the plate, and to drive the spikes through the meat and into contact with the grill. Upon raising the device, the spring biased plate expels the meat from the spikes.

While prior art devices such as this are undoubtedly effective in reducing shrinkage and cooking time, they are wholly unsuitable for use in a fast food restaurant. As discussed above, a portable device that is easily removed from the grill for cleaning, and which can be placed over slabs of meat at an arbitrary position on the grill is required. The prior art devices are manifestly unsuited to this application. Also, a device having multiple springs and an elaborate biasing mechanism is complex, making it both expensive and hard to clean.

The type of meat that is typically served in fast food restaurants imposes further requirements. First, the slabs of meat are often frozen prior to cooking, thereby preventing the spikes from passing through the meat immediately. Rather, the spikes must be urged downward as the meat thaws. In order to effect such a gradual penetration with prior art devices, the operator must remain in attendance to gradually push the spikes through the meat. Any attempt to accomplish this at a rate that is greater than that at which the meat thaws to accommodate the spikes can result in a shattering of the frozen slabs. Additionally, certain of the foods served in fast food restaurants are incapable of withstanding much pressure. For example, fish fillets are easily crushed and deformed unless care is taken to regulate the amount of pressure applied thereto. The prior art devices are capable of exerting considerable force on the slabs of meat to be cooked, and it is difficult to apply a pressure that is sufficient to drive the spikes through the slab while at the same time insufficient to crush the slab with the spring-biased plate. If indeed possible, it requires that the operator pay careful attention to the amount of biasing applied to the cooking device in order not to apply excessive pressure.

Accordingly, there has been presented the need in the fast food restaurant industry for a portable self-cleaning device for cooking slabs of meat, often frozen, on a grill without shattering, crushing, or deforming them. Efforts to design such a device have been generally unsuccessful to date.

SUMMARY OF THE INVENTION

The present invention provides a portable self-cleaning device for cooking slabs of meat at an arbitrary position on a grill in a reduced time period. The device automatically applies a controlled pressure to avoid either shattering frozen slabs of meat or crushing relatively delicate slabs.

The device comprises a generally flat heat conductive weighted member which overlies the slabs of meat and has a plurality of generally equal length heat conductive spikes mounted thereto and extending towards the grill. The weighted member is sufficiently heavy to urge the spikes through slabs of meat positioned thereunder while insufficiently heavy to shatter frozen slabs. Between the weighted member and the grill is a heat conductive plate having a plurality of apertures spaced and sized to permit the plate to slide freely along the spikes. The spikes are of a length such that their extension from the weighted member exceeds the thickness of the heat conductive plate by an amount corresponding to the maximum thickness of a slab of meat to be cooked. The device also includes carriage means for preventing the apertured plate from moving away from the weighted member by a distance greater than the length of the spikes while allowing the plate to contact the grill under its own weight when the device is placed directly on the grill. A peripheral skirt extends from the weighted member towards the grill a distance less than the length of the spikes, to allow the spike tips to contact the grill.

In operation, the entire device may be placed directly on the grill which directly conductively heats the plate and the spikes, and further heats the weighted member through the spikes. Thus, subsequent placement of the device over slabs to be cooked causes the weighted member to urge the spikes through the slabs, thereby cooking the slabs partially from within. Once the spikes have passed through the meat so as to contact the grill, they conduct additional heat from the grill to the interior of the slabs. In the meantime, the apertured plate sits atop the slabs of meat, thereby promoting intimate contact between the slabs and the grill, cooking the slabs partially from above, and preventing moisture loss. The meat cooks in a sharply reduced time, thereby shrinking less and requiring less energy for cooking than if the device were not used. It should be noted that the weighted member and the apertured plate are independently urged downward, each by its own weight and without need for external biasing means. For a given number of meat slabs being cooked the respective pressures are immediately established by placement of the device and are repeatably obtained. When the device is lifted away from the slabs of meat, the weight of the apertured plate expels the slabs of meat and cleans the spikes of any meat fragments that might otherwise tend to adhere.

The skirt surrounding the periphery of the device serves two functions. First, it protects the relatively delicate spikes from being bent or broken when the device is subjected to possible rough handling. It is important to maintain the spikes in alignment to ensure that the apertured plate is free to slide along its entire length of travel without obstruction. Protecting the spikes in this manner results in a device which is extremely rugged and reliable. Additionally, the skirt increases the effectiveness of the device by further preventing loss of moisture and retaining heated air in the neighborhood of the cooking slabs.

For a further understanding of the nature and advantages of this invention, reference should be had to the ensuing detailed description taken in conjunction with the accompanying drawings.

BRIEF DESCRIPTION OF THE DRAWINGS

FIG. 1 is a partially cut away perspective view of a grilling device according to the present invention;

FIG. 2 is an exploded perspective view of the device;

FIGS. 3-5 are sectional views taken through line 5—5 of FIG. 1 illustrating a sequence for cooking slabs of meat on a grill utilizing the device.

DESCRIPTION OF THE PREFERRED EMBODIMENT

FIG. 1 shows a grilling device 5 constructed according to the present invention. In use, device 5 is placed atop a plurality of meat slabs 10 that are being cooked on a flat grill surface 15, grill surface 15 being typically heated by electricity or gas. Broadly, device 5 comprises a heat conductive weighted member 20, a plurality of heat conductive spikes 22 connected to weighted member 20 and extending from a grill facing surface of weighted member 20 toward grill surface 15, a heat conductive weighted plate 25, being apertured to permit spikes 22 to pass therethrough, and a peripheral skirt 27. A handle 28, constructed of material having poor heat conduction properties, is attached to a grill removed surface of weighted member 20.

With additional reference to FIGS. 2 and 3, a preferred construction of weighted member 20 may be seen. Weighted member 20 comprises a generally nonperforated plate 30, and a perforated plate 35. Plate 35 has a plurality of perforations 37 in a generally rectangular array and a grill facing surface 38. Means is provided for fastening plates 30 and 35 in a rigid manner. For example, each of a plurality of bolts 40 passes through one of a corresponding plurality of apertures 42 in plate 30 and threadable engages one of a plurality of threaded apertures 45 in plate 35.

The above construction of weighted member 20 is well adapted to mounting spikes 22 and peripheral skirt 27. Peripheral skirt 27 includes four rectilinearly disposed sides 50 that extend perpendicular to the plane of plate 30, each side 50 having an inwardly turned flange 52 that extends parallel to the plane of plate 30. Each spike 22 includes a body portion 55 that terminates in a pointed tip 57 at one end, and a broadened head portion 60 at the other end. The thickness of head portion 60 is slightly less than or equal to the thickness of flange 52 while body portion 55 is at least as long as the height of skirt sides 50. Weighted member 20 is assembled by sandwiching flanges 52 and spike heads 60 between plates 30 and 35 with spike body portions 55 extending through perforations 37. Perforations 37 are sized to substantially prevent transverse movement of spikes 22. This construction provides a relatively rigid weighted member 20 with good thermal conduction established between spikes 22 and the plates of weighted member 20.

Apertured plate 25 includes a plurality of apertures 65 corresponding to the array of spikes 22 so that plate 25 is free to slide along the length of spikes 22. Apertures 65 are generally greater than perforations 37 to help ensure free slideability. Plate 25 has a grill facing surface 62 and a grill removed surface 63. Carriage means is provided to prevent apertured plate 25 from disengaging itself from spikes 22. In particular, movement is restricted so that grill removed surface 63 of apertured plate 25 cannot move farther from weighted member 20 than the length of the portions of spikes 22 that protrude beyond grill facing surface 38. The carriage means includes at least two posts 80, each post having a head portion 82, a body portion 84, and a threaded end portion 86. Weighted member 20 is provided with two openings 90 extending through both plates 30 and 35, openings 90 being sized so that body portions 84 may freely pass therethrough while head portions 82 may not. Apertured plate 25 has respective threaded holes 91 for engagement with respective threaded end portions 86 of posts 80. The length of body portions 84, less the total thickness of weighted member 20 defines the maximum excursion of apertured plate 25. This dimension is chosen to permit apertured plate 25 to move sufficiently far from weighted member 20 that grill facing surface 62 is no closer to member 20 than tips 57 of spikes 22 while ensuring that grill removed surface 63 is no farther from member 20 than tips 57 of spikes 22.

Device 5 may be constructed from a variety of heat conductive materials. In the preferred embodiment plates 30 and 35 of weighted member 20 and apertured plate 25 are constructed of ¼ inch, 6061 specification aluminum extrusion, black anodized by an Alcoa process designated "Duranotic." Spikes 22 are preferably 310 gauge stainless steel and peripheral skirt 27 is stainless steel sheet stock or 5051 aluminum. Handle 32 may be made of any material that is a poor conductor of heat and that can withstand fairly high temperatures at local portions thereof, as might be used in a pot handle. Suitable materials include wood and certain plastics, a PVC class plastic being preferred.

Having set forth the structure of device 5, the operation of the present invention may be understood. FIGS. 3-5 illustrate a preferred sequence for cooking one or more slabs of meat according to the present invention.

As shown in FIG. 3, device 5 is first placed directly on grill surface 15. Since apertured plate 25 is freely slideable along spikes 22, and since posts 80 permit sufficient movement, grill facing surface 62 of apertured plate 25 directly contacts grill surface 15. At the same time tips 57 of spikes 22 also directly contact grill surface 15. Since skirt sides 50 are no higher than the length of spikes 22, skirt 27 does not prevent the spikes from contacting the grill. During this time, apertured plate 25 is conductively heated by grill 15, while weighted member 20 absorbs heat from the grill conductively through spikes 22 and, so long as member 20 is cooler than apertured plate 25, by radiation from plate 25.

As shown in FIG. 4, device 5 is then placed atop one or more slabs of meat 10 at a desired position on grill surface 15. Apertured plate 25 contacts a grill removed surface 92 of slabs 10 while grill 15 contacts an opposite surface 95. The weight of weighted member 20 is sufficient to force spikes 22 through slabs 10. If slabs 10 were previously frozen, the penetration occurs as spikes 25 conduct heat from weighted member 20 to locally thaw portions of slabs 10. During this time, both surfaces of slabs 10 are being cooked, grill 15 cooking lower surface 95 and apertured plate 25 cooking upper surface 92. The weight of apertured plate 25 further speeds cooking by promoting intimate contact between slabs 10 and grill 15. In the event that plate 25 becomes cooler than weighted member 20, plate 25 absorbs heat radiated from weighted member 20.

After an interval of time that depends on whether the slabs were frozen or not, spikes 22 completely penetrate slabs 10 so that spike tips 57 contact grill surface 15. This is illustrated in FIG. 5. In this position, cooking of the upper and lower surfaces continues as above, but extra heat is now conducted from grill surface 15 into spikes 22, thereby cooking slabs 10 partially from within. Additionally, spikes 22 conduct heat to weighted member 20 (to which they are relatively rigidly attached) and to some extent to plate 25 due to contact between body portions 55 and plate 25. In this final cooking position, peripheral skirt 27 sits such that it extends almost down to grill surface 15. This prevents moisture in the meat from being lost and further keeps heated air in the vicinity of the cooking slabs.

The net result is that slabs 10 are cooked in a very short time. For example, a hamburger patty that takes over 3 minutes to cook without the device can be cooked in approximately 40 seconds with the device. The slabs therefore shrink less and require a smaller amount of energy for cooking. In the case of a fast food restaurant, these savings are truly significant.

When slabs 10 have been cooked, or if for some reason it is desired to turn them over, device 5 is lifted away from grill 15 by means of handle 32. The weight of apertured plate 25 is sufficient to eject slabs 10 from spikes 22, thereby also removing any fragments of meat that might otherwise adhere to spikes 22. At the same time, the weight of apertured plate 25 is insufficient to crushingly deform slabs 20 during cooking. Certain types of meats such as fish fillets have no inherent strength to withstand extreme compressive forces that might be generated by a plate that is too heavy.

It should be noted that the entire operation from initial placement to withdrawal of the device occurs substantially without operator intervention. The weight of weighted member 20 is sufficient to urge the spikes through the meat, being unimpeded by plate 25 which is independent of member 20 (not being spring biased away from it). Controlled pressure is immediately established, and maintained throughout.

Given that device 5 is portable and may be used over slabs of meat in any position on the grill, it is anticipated that device 5 will undergo a considerable amount of handling. In the context of a fast food restaurant, the utmost care is not always likely to be taken. Accordingly, it is necessary to protect the relatively delicate spikes 22 from becoming bent which would impede the free movement of plate 25. Peripheral skirt 27 serves this function in addition to its heat and moisture retention functions during cooking.

Device 5 is readily disassembled for cleaning by disengaging post 80 from apertured plate 25. Weighted member 20 may be further disassembled by removing bolts 40, although in certain applications such further disassembly may not be necessary.

It can thus be seen that the present invention provides a portable grilling device that cooperates with a standard grill to cook slabs of meat in a short time, thus reducing shrinkage and lowering energy consumption. The operation is enhanced by the peripheral skirt, the skirt also protecting the spikes from bending under possible rough handling. Due to the self-biasing arrangement that eliminates springs and the like, the weighted spiked member and the apertured plate independently apply controlled, readily reproduced pressure to the slabs, thereby avoiding problems of crushing or shattering them. The device is self-cleaning in the sense that the apertured plate has sufficient weight to eject the slabs.

While the above provides a full and complete disclosure of the preferred embodiment of the invention, various modifications, alternate constructions, and equivalents may be employed without departing from the true spirit and scope of the invention. For example, while the weighted member, spikes, and skirt have been described as being in a sandwich configuration, the weighted member may be of unitary construction with the spikes threadably attached. Therefore, the above description and illustrations should not be construed as limiting the scope of the invention, which is defined by the appended claims.

What is claimed is:

1. A portable self-cleaning device for cooking slabs of meat at an arbitrary position on a grill in a reduced time, comprising:

a weighted member;

piercing means mounted to the weighted member wherein the weight of the weighted member is sufficient to urge the piercing means through slabs of meat positioned thereunder;

skirt means mounted to the weighted member and at least partially surrounding the piercing means to protect the piercing means from damage;

heat conductive pressure means engaged with the piercing means and freely movable relative to the weighted member toward and away from the grill surface, the pressure means being devoid of spring coupling to the weighted member so as not to affect the weighted member's urging the piercing means through the slabs, the pressure means being of sufficient weight to clean the piercing means and disengage meat slabs from the piercing means by gravity alone independently of the weighted member when the device is lifted away from the grill; and carriage means for maintaining the pressure means in engagement with the piercing means when the device is lifted away from the grill, but allowing the pressure means to assume a position in contact with the grill such that the piercing means and the pressure means contact the grill when the device is placed directly on the grill, in which position the grill directly conductively heats the pressure means and the piercing means, and further heats the weighted member through the piercing means, such that subsequent placement of the device over the slabs causes the weighted member to urge the piercing means through the slabs to cook the slabs partially from within, and causes the pressure means to contact the surface of the slabs remote from the grill to cook the slabs partially from above and to urge the slabs into intimate contact with the grill, the skirt means serving to prevent the escape of heated air and moisture from the vicinity of the cooking slabs.

2. The device of claim 1 wherein the piercing means comprises a plurality of generally equal length heat conductive spikes mounted to the weighted member, and wherein the pressure means comprises a heat conductive apertured plate having portions defining a plurality of apertures corresponding to the plurality of spikes, each aperture being sized to slidingly accommodate a corresponding spike.

3. A portable self-cleaning device for cooking slabs of meat at an arbitrary position on a grill in a reduced time, comprising:
   a generally flat heat conductive weighted member having a grill facing surface;
   a plurality of generally equal length heat conductive spikes mounted to the weighted member and extending a predetermined distance from the grill facing surface of the weighted member toward the grill, the weight of the weighted member being sufficient to force the spikes through slabs of meat positioned thereunder;
   a peripheral skirt extending from the grill facing surface of the weighted member toward the grill a distance no more than the predetermined distance, the skirt being sufficiently strong to protect the spikes from damage;
   a heat conductive apertured plate having a grill facing surface and a grill removed surface, being of a sufficient weight to eject the meat slabs from the spikes and having a thickness less than the predetermined distance, the plate having a plurality of apertures corresponding to the plurality of spikes through which apertures the spikes slidingly fit, the plate being freely slideable along the spikes and devoid of spring coupling to the weighted member such that the plate is urged toward the grill by gravity alone independently of the weighted member and does not affect the weighted member's forcing the spikes through the slabs; and
   carriage means for establishing a position of maximum separation between the apertured plate and the weighted member wherein the grill facing surface of the weighted member is at least the predetermined distance from the grill facing surface of the apertured plate and at the same time at most the predetermined distance from the grill removed surface of the apertured plate, the carriage means preventing movement of the apertured plate away from the weighted member only at the position of maximum separation, thus allowing the apertured plate to freely assume a grill contacting position wherein the grill facing surface of the apertured plate is displaced from the grill facing surface of the weighted member by the predetermined distance such that the plate and the spikes contact the grill when the device is placed directly on the grill, in which grill contacting position the grill directly conductively heats the apertured plate and the spikes and further heats the weighted member through the spikes such that subsequent placement of the device over the slabs causes the weighted member to urge the spikes through the slabs to cook the slabs partially from within, and causes the apertured plate to contact the surface of the slabs remote from the grill to cook the slabs partially from above and to promote intimate contact between the slabs and the grill, the peripheral skirt serving to prevent the escape of heated air and moisture from the vicinity of the cooking slabs, the spikes being cleaned and any slabs of meat being cooked on the grill being removed from the spikes by the weight of the plate alone when the weighted member is moved away from the grill.

4. The device of claim 3 wherein the peripheral skirt includes an inwardly turned flange, wherein each spike includes a head portion having a thickness no greater than the thickness of the flange, and wherein the weighted member comprises a first relatively non-perforated plate, a second perforated plate, and means for holding the non-perforated plate and the perforated plate together with the spike heads and skirt flange sandwiched therebetween and with the spikes extending through the perforations of the perforated plate.

5. The device of claim 3 wherein the carriage means comprises a plurality of posts extending generally parallel to the spikes, each post extending through an opening in the weighted member, terminating at one end in a head of larger diameter than the opening and being fastened at an opposite end to the apertured plate.

6. A portable self cleaning device for cooking slabs of meat at an arbitrary position on a grill in a reduced time, comprising:
   a weighted member including a first relatively non-perforated plate, a second perforated plate, and means for holding the non-perforated plate and the perforated plate together;
   a plurality of generally equal length heat conductive spikes, each spike including a pointed body portion and a head portion having a specified thickness;
   a peripheral skirt having a circumferential dimension corresponding to the perforated and non-perforated plates, and including an inwardly turned flange having a thickness approximately equal to the thickness of the spike head portions, such that the holding means maintains the non-perforated plate and the perforated plate together with the spike heads and skirt flange sandwiched therebetween and the spike body portions extending through the perforations of the perforated plate by a predetermined distance;
   the weight of the weighted member sufficient to force the spikes through slabs of meat positioned thereunder;
   a third apertured plate of heat conductive material having a plurality of apertures corresponding to the perforations in the second perforated plate, having sufficient weight to eject the meat slabs from the spikes and having a thickness less than the predetermined distance, the apertured plate being freely slidable along the spikes and devoid of spring coupling to the weighted member such that the apertured plate is urged toward the grill by gravity along independently of the weighted member and does not affect the weighted member's forcing the spikes through the slabs; and carriage means for establishing a position of maximum separation between the apertured plate and the weighted member wherein a grill facing surface of the perforated plate is at least the predetermined distance from a grill facing surface of the apertured plate, and at the same time at most the predetermined distance from a grill removed surface of the apertured plate, the carriage means preventing movement of the apertured plate away from the weighted member only at the position of maximum separation, thus allowing the apertured plate to freely assume a grill contacting position wherein the apertured plate and the spikes contact the grill when the device is placed directly on the grill, in which grill contacting position the grill directly conductively heats the apertured plate and the spikes, and further heats the weighted member through the spikes such that subsequent placement of the device over the slabs causes the weighted member to urge the spikes through the slabs to cook the slabs partially from within, and causes the apertured plate to contact the surface of the slabs remote from the grill to cook the slabs partially from above while promoting intimate contact between the slabs and the grill, the peripheral skirt serving to prevent the escape of heated air and moisture from the vicinity of the cooking slabs while protecting the spikes from damage, the spikes being cleaned and any slabs of meat being cooked on the grill being removed from the spikes by the weight of the apertured plate alone when the weighted member is moved away from the grill.

7. A portable self-cleaning apparatus for cooking slabs of meat at an arbitrary position on a grill in a reduced time, comprising:

a generally flat heat conductive weighted member having a grill facing side which has a plurality of generally equal length heat conductive spikes extending therefrom towards the grill, the spikes each being directly connected at a first end thereof to the weighted member to extend from the grill facing side of the member and having a generally pointed portion extending towards the grill at a second end thereof, the weight of the weighted member being sufficient to force the spikes through slabs of meat positioned thereunder;

a heat conductive plate having a grill facing surface, being of a sufficient weight to eject the meat slabs and having a thickness less than the length of the spikes, the plate having a plurality of apertures therethrough corresponding to the plurality of spikes, through which apertures the spikes slidingly fit, the plate being freely slideable along the spikes and devoid of spring coupling to the weighted member such that the plate is urged toward the grill by gravity alone independently of the weighted member and does not affect the weighted member's forcing the spikes through the slabs; and means for preventing the plate from moving a distance greater than the length of the spikes away from the weighted member while allowing the plate to assume a position with the grill facing surface proximate the second ends of the spikes wherein the plate is proximate the grill and the spikes contact the grill when the apparatus is placed directly on the grill, in which position the grill heats the plate and conductively heats the spikes and further heats said weighted member through the spikes such that subsequent placement of the apparatus over the slabs causes the weighted member to urge the spikes through the slabs to cook the slabs partially from within, and causes the plate to contact the surface of the slabs remote from the grill to cook the slabs partially from above, the spikes being cleaned and any slabs of meat being cooked on the grill being removed from the spikes by the weight of the plate alone when the weighted member is moved away from the grill.

8. The apparatus of claim 7 also comprising a peripheral skirt extending from the grill facing side of the weighted member toward the second end of the spikes to protect the spikes from damage.

* * * * *